(12) United States Patent
Himmelmann et al.

(10) Patent No.: US 9,643,723 B2
(45) Date of Patent: May 9, 2017

(54) SLIDE BUSHING SUPPORTED AIRCRAFT CARGO LOADING SYSTEMS AND METHODS

(71) Applicant: Goodrich Corporation, Charlotte, NC (US)

(72) Inventors: Richard A. Himmelmann, Beloit, WI (US); Stephen E. Tongue, Hampden, MA (US)

(73) Assignee: GOODRICH CORPORATION, Charlotte, NC (US)

(*) Notice: Subject to any disclaimer, the term of this patent is extended or adjusted under 35 U.S.C. 154(b) by 0 days.

(21) Appl. No.: 14/511,559

(22) Filed: Oct. 10, 2014

(65) Prior Publication Data

US 2016/0101857 A1  Apr. 14, 2016

(51) Int. Cl.
  *B64D 9/00* (2006.01)
  *B65G 39/00* (2006.01)

(52) U.S. Cl.
  CPC .......... *B64D 9/00* (2013.01); *B64D 2009/006* (2013.01)

(58) Field of Classification Search
  None
  See application file for complete search history.

(56) References Cited

U.S. PATENT DOCUMENTS

| | | |
|---|---|---|
| 1,437,964 A | 12/1922 | Fitch |
| 2,918,183 A | 12/1959 | Petersen |
| 3,055,446 A | 9/1962 | Vaughen |
| 3,081,886 A | 3/1963 | Flexman et al. |
| 3,190,460 A | 6/1965 | Rubin |
| 3,209,929 A | 10/1965 | Petersen et al. |
| 3,282,359 A | 11/1966 | Satterfield, Jr. |
| 3,513,934 A | 5/1970 | Crowley |
| 3,561,623 A | 2/1971 | McCaul |
| 3,597,117 A | 8/1971 | Zoehfeld |
| 3,756,342 A | 9/1973 | Burdick |
| 3,756,544 A | 9/1973 | Bader |
| 3,773,391 A | 11/1973 | Crandall et al. |
| 3,776,492 A | 12/1973 | Iben |
| 3,780,823 A | 12/1973 | Michaud |
| 3,796,279 A | 3/1974 | Burdick |
| 3,807,035 A | 4/1974 | Moorman |
| 3,809,268 A | 5/1974 | Lutz |
| 3,869,028 A | 3/1975 | Sawada |
| 3,899,092 A | 8/1975 | Nordstrom |
| 3,908,785 A | 9/1975 | Vaughen |
| 3,986,605 A | 10/1976 | Dooley et al. |
| 4,131,320 A | 12/1978 | Volat et al. |

(Continued)

FOREIGN PATENT DOCUMENTS

| | | |
|---|---|---|
| AU | 442872 | 11/1973 |
| BE | 723545 | 4/1969 |

(Continued)

OTHER PUBLICATIONS

Preinterview First Office Action dated Sep. 4, 2015 in U.S. Appl. No. 14/512,000.

(Continued)

*Primary Examiner* — Kavel Singh
(74) *Attorney, Agent, or Firm* — Snell & Wilmer L.L.P.

(57) ABSTRACT

A cargo management system is provided comprising a slide bushing supported cargo shuttle, an actuator coupled to a bushing slide plate; an aft shuttle drive belt coupled to the slide bushing supported cargo shuttle; and a forward shuttle drive belt coupled to the slide bushing supported cargo shuttle. Also disclosed is a slide bushing supported cargo shuttle comprising a housing, a bushing slide plate extendable from the housing via an actuator and a top surface of the bushing supported cargo shuttle and a power drive unit coupled to the top surface.

14 Claims, 6 Drawing Sheets

(56) References Cited

U.S. PATENT DOCUMENTS

| | | | |
|---|---|---|---|
| 4,139,071 A | 2/1979 | Tackett | |
| 4,155,421 A | 5/1979 | Johnson | |
| 4,216,927 A | 8/1980 | Byrd | |
| 4,304,521 A | 12/1981 | Hammond | |
| 4,353,457 A | 10/1982 | Haley | |
| 4,354,796 A | 10/1982 | Bergman | |
| 4,441,571 A | 4/1984 | Wood | |
| 4,544,319 A * | 10/1985 | Folling | B64C 1/22 198/457.03 |
| 4,567,957 A | 2/1986 | Johnson | |
| 4,600,169 A | 7/1986 | Koster et al. | |
| 4,618,292 A | 10/1986 | Judge et al. | |
| 4,676,699 A | 6/1987 | Leonov | |
| 4,804,077 A | 2/1989 | John, Jr. | |
| 4,815,926 A | 3/1989 | Chaffee et al. | |
| 4,878,635 A * | 11/1989 | Nordstrom | B64D 9/00 244/118.1 |
| 4,951,770 A | 8/1990 | Vaughen | |
| 4,984,756 A | 1/1991 | Anders | |
| 5,120,184 A | 6/1992 | Gerawan | |
| 5,137,367 A * | 8/1992 | Madonia | B01F 11/00 366/218 |
| 5,184,366 A | 2/1993 | Rawdon | |
| 5,207,115 A | 5/1993 | Takei | |
| 5,226,773 A | 7/1993 | Morito | |
| 5,311,973 A | 5/1994 | Tseng et al. | |
| 5,350,270 A | 9/1994 | Stallard et al. | |
| 5,456,556 A | 10/1995 | Petrovic | |
| 5,634,636 A | 6/1997 | Jackson et al. | |
| 5,690,567 A | 11/1997 | DeNijs et al. | |
| 5,850,906 A | 12/1998 | Dean | |
| 5,893,450 A | 4/1999 | Metivier | |
| 6,196,788 B1 | 3/2001 | Talbot et al. | |
| 6,296,588 B1 | 10/2001 | Ciemniecki | |
| 6,310,286 B1 | 10/2001 | Troxel | |
| 6,427,947 B1 | 8/2002 | Rohrlick et al. | |
| 6,495,761 B1 | 12/2002 | Hacker | |
| 6,517,028 B2 | 2/2003 | Huber | |
| 6,630,633 B1 | 10/2003 | Uber et al. | |
| 6,640,963 B2 | 11/2003 | Lecrivain | |
| 7,073,994 B2 * | 7/2006 | Huber | B64D 9/00 410/92 |
| 7,108,474 B2 | 9/2006 | Moriya et al. | |
| 7,210,280 B2 | 5/2007 | Cottone | |
| 7,393,159 B2 | 7/2008 | Chang et al. | |
| 7,426,974 B1 | 9/2008 | Yeghiayan | |
| 7,494,004 B2 | 2/2009 | Stolyar et al. | |
| 7,513,716 B2 | 4/2009 | Hayashi et al. | |
| 7,643,133 B2 | 1/2010 | Milender | |
| 7,695,235 B1 | 4/2010 | Rallis | |
| 7,785,056 B2 * | 8/2010 | Sanford | B64D 9/00 414/392 |
| 7,800,009 B2 | 9/2010 | Gochar, Jr. | |
| 7,845,898 B2 | 12/2010 | Rawdon et al. | |
| 7,913,950 B2 | 3/2011 | Huber | |
| 8,056,701 B2 | 11/2011 | Sugimoto | |
| 8,162,571 B2 | 4/2012 | Wada et al. | |
| 8,356,966 B2 | 1/2013 | Voorhees | |
| 8,376,124 B1 | 2/2013 | Rosen | |
| 8,499,922 B2 | 8/2013 | Hoshi | |
| 8,602,204 B2 | 12/2013 | Yang et al. | |
| 9,156,553 B1 | 10/2015 | Johnson | |
| 9,205,923 B1 | 12/2015 | Himmelmann | |
| 9,284,130 B1 | 3/2016 | Himmelmann | |
| 9,290,270 B2 | 3/2016 | Himmelmann | |
| 9,352,835 B2 | 5/2016 | Himmelmann | |
| 9,387,931 B2 | 7/2016 | Himmelmann | |
| 9,452,901 B2 | 9/2016 | Panzram | |
| 9,511,860 B2 | 12/2016 | Himmelmann | |
| 9,511,861 B2 | 12/2016 | Himmelmann | |
| 9,555,888 B2 | 1/2017 | Himmelmann | |
| 9,567,166 B2 | 2/2017 | Himmelmann | |
| 2002/0164236 A1 | 11/2002 | Fukuhara | |
| 2004/0241267 A1 * | 12/2004 | Schultz | A21C 11/006 425/193 |
| 2004/0245397 A1 | 12/2004 | Garcia | |
| 2007/0007391 A1 | 1/2007 | McCoskey | |
| 2007/0023259 A1 | 2/2007 | Schonauer | |
| 2007/0025832 A1 | 2/2007 | Rawdon et al. | |
| 2007/0074891 A1 | 4/2007 | Burke | |
| 2007/0125908 A1 | 6/2007 | Elchholz | |
| 2008/0011119 A1 * | 1/2008 | Bartosch | F16H 53/06 74/567 |
| 2008/0257692 A1 | 10/2008 | Wallace | |
| 2008/0267751 A1 | 10/2008 | Safir | |
| 2009/0252568 A1 | 10/2009 | Morin | |
| 2009/0304482 A1 | 12/2009 | Sanford | |
| 2010/0006401 A1 | 1/2010 | Flury et al. | |
| 2011/0215198 A1 | 9/2011 | Panzram et al. | |
| 2011/0240805 A1 | 10/2011 | Komiya | |
| 2011/0273313 A1 | 11/2011 | Hettwer | |
| 2012/0014757 A1 | 1/2012 | Muller | |
| 2012/0138434 A1 | 6/2012 | Trieb | |
| 2012/0170227 A1 | 7/2012 | Bayliss | |
| 2012/0262849 A1 | 10/2012 | Prax | |
| 2013/0075065 A1 | 3/2013 | Degner et al. | |
| 2013/0287505 A1 | 10/2013 | Seibt | |
| 2013/0313073 A1 | 11/2013 | Huber | |
| 2014/0097296 A1 | 4/2014 | Sankrithi | |
| 2014/0338557 A1 | 11/2014 | Zhou | |
| 2014/0367515 A1 | 12/2014 | Lohmann | |
| 2014/0373747 A1 | 12/2014 | Yagci | |
| 2014/0377017 A1 | 12/2014 | Panzram | |
| 2015/0225082 A1 | 8/2015 | Levron | |
| 2015/0298808 A1 | 10/2015 | Huber | |
| 2016/0052630 A1 | 2/2016 | Himmelmann | |
| 2016/0101858 A1 | 4/2016 | Himmelmann | |
| 2016/0101859 A1 | 4/2016 | Himmelmann | |
| 2016/0101860 A1 | 4/2016 | Himmelmann | |
| 2016/0101861 A1 | 4/2016 | Himmelmann | |
| 2016/0101862 A1 | 4/2016 | Himmelmann | |
| 2016/0101863 A1 | 4/2016 | Himmelmann | |
| 2016/0101947 A1 | 4/2016 | Himmelmann | |
| 2016/0194081 A1 | 7/2016 | Himmelmann | |
| 2016/0194083 A1 | 7/2016 | Himmelmann | |
| 2016/0221763 A1 | 8/2016 | Himmelmann | |
| 2017/0036763 A1 | 2/2017 | Himmelmann | |
| 2017/0043874 A1 | 2/2017 | Himmelmann | |

FOREIGN PATENT DOCUMENTS

| | | |
|---|---|---|
| CA | 903562 | 6/1972 |
| DE | 3440933 | 10/1985 |
| DE | 102008040751 | 1/2010 |
| DE | 102010035099 | 2/2012 |
| EP | 0377692 | 7/1990 |
| EP | 1547893 | 6/2005 |
| EP | 2815970 | 12/2014 |
| FR | 1360952 | 5/1964 |
| FR | 2340636 | 9/1977 |
| FR | 2448454 | 9/1980 |
| GB | 1210244 | 10/1970 |
| GB | 2182015 | 5/1987 |
| JP | 2000128322 | 5/2000 |
| WO | 8706909 | 11/1987 |
| WO | 8801975 | 3/1988 |
| WO | 9819940 | 5/1998 |
| WO | 0066463 | 11/2000 |
| WO | 2005028248 | 3/2005 |
| WO | 2005039036 | 4/2005 |
| WO | 2008091287 | 7/2008 |
| WO | 2014049590 | 4/2014 |

OTHER PUBLICATIONS

Notice of Allowance dated Oct. 19, 2015 in U.S. Appl. No. 14/512,000.

Extended European Search Report dated Feb. 9, 2016 in European Application No. 15181603.0.

Extended European Search Report dated Feb. 11, 2016 in European Application No. 15189145.4.

(56) References Cited

OTHER PUBLICATIONS

Extended European Search Report dated Feb. 18, 2016 in European Application No. 15189116.5.
Extended European Search Report dated Feb. 18, 2016 in European Application No. 15189127.2.
Extended European Search Report dated Feb. 19, 2016 in European Application No. 15189129.8.
Extended European Search Report dated Mar. 7, 2016 in European Application No. 15189114.0.
Extended European Search Report dated Mar. 11, 2016 in European Application No. 15189140.5.
Extended European Search Report dated Mar. 11, 2016 in European Application No. 15189107.4.
Extended European Search Report dated Mar. 11, 2016 in European Application No. 15189119.9.
Extended European Search Report dated Mar. 14, 2016 in European Application No. 15189121.5.
Extended European Search Report dated Mar. 16, 2016 in European Application No. 15189124.9.
Notice of Allowance dated Mar. 24, 2016 in U.S. Appl. No. 14/512,113.
Notice of Allowance dated Nov. 13, 2015 in U.S. Appl. No. 14/464,323.
Notice of Allowance dated Jan. 20, 2016 in U.S. Appl. No. 14/511,553.
Corrected Notice of Allowability Jan. 7, 2016 in U.S. Appl. No. 14/464,323.
Preinterview First Office Action dated Jan. 7, 2016 in U.S. Appl. No. 14/512,113.
Preinterview First Office Action dated Sep. 8, 2016 in U.S. Appl. No. 14/512,056.
Supplemental Notice of Allowability dated May 3, 2016 in U.S. Appl. No. 14/512,113.
Notice of Allowance dated Apr. 1, 2016 in U.S. Appl. No. 14/511,645.
Supplemental Notice of Allowability dated Jun. 3, 2016 in U.S. Appl. No. 14/512,113.
Extended European Search Report dated Jun. 22, 2016 in European Application No. 16153483.9.
Preinterview First Office Action dated Jun. 30, 2016 in U.S. Appl. No. 14/512,056.
Extended European Search Report dated Jul. 11, 2016 in European Application No. 16150150.7.
Partial European Search Report dated Mar. 18, 2016 in European Application No. 15189110.8.
Extended European Search Report dated Jul. 4, 2016 in European Application No. 15189110.8.
Notice of Allowance dated Oct. 4, 2016 in U.S. Appl. No. 14/512,127.
Notice of Allowance dated Oct. 7, 2016 in U.S. Appl. No. 14/512,118.
Notice of Allowance dated Oct. 11, 2016 in U.S. Appl. No. 14/512,011.
Notice of Allowance dated Oct. 11, 2016 in U.S. Appl. No. 14/512,066.
Preinterview First Office Action dated Oct. 25, 2016 in U.S. Appl. No. 14/610,391.
Corrected Notice of Allowability dated Nov. 1, 2016 in U.S. Appl. No. 14/512,011.
Corrected Notice of Allowability dated Oct. 27, 2016 in U.S. Appl. No. 14/512,118.
Corrected Notice of Allowability dated Oct. 27, 2016 in U.S. Appl. No. 14/512,127.
U.S. Appl. No. 15/373,536, filed Dec. 9, 2016 and entitled Pressure Compensating Air Curtain for Air Cushion Supported Cargo Loading Platform.
Corrected Notice of Allowability dated Dec. 15, 2016 in U.S. Appl. No. 14/512,127.
Office Action dated Dec. 15, 2016 in U.S. Appl. No. 14/511,902.
Notice of Allowance dated Dec. 21, 2016 in U.S. Appl. No. 14/610,391.
Preinterview First Office Action dated Dec. 21, 2016 in U.S. Appl. No. 14/589,742.
U.S. Appl. No. 15/393,423, filed Dec. 29, 2016 and entitled Compact Centrifgual Air Blowers for Air Cushion Supported Cargo Loading Platform.

* cited by examiner

SLIDE BUSHING SUPPORTED AIRCRAFT CARGO LOADING SYSTEMS AND METHODS

FIELD

The present disclosure relates generally to cargo management systems.

BACKGROUND

Conventional aircraft cargo systems typically include various tracks and rollers that span the length of an aircraft. Power drive units ("PDUs") convey cargo forward and aft along the aircraft on conveyance rollers which are attached to the aircraft floor structure. Cargo may be loaded from an aft position on an aircraft and conducted by the cargo system to a forward position and/or, depending upon aircraft configuration, cargo may be loaded from a forward position on an aircraft and conducted by the cargo system to an aft position. Conventional systems are typically designed to accommodate a particular pallet size. Conventional systems are typically comprised of numerous components that may be time consuming to install, replace and maintain.

SUMMARY

The features and elements described herein may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

A cargo management system is provided comprising a slide bushing supported cargo shuttle, an actuator coupled to a bushing slide plate; an aft shuttle drive belt coupled to the slide bushing supported cargo shuttle; and a forward shuttle drive belt coupled to the slide bushing supported cargo shuttle. Also disclosed is a slide bushing supported cargo shuttle comprising a housing, a bushing slide plate extendable from the housing via an actuator and a top surface of the bushing supported cargo shuttle.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option.

As used herein, "aft" refers to the direction associated with the tail of an aircraft, or generally, to the direction of exhaust of the gas turbine. As used herein, "forward" refers to the direction associated with the nose of an aircraft, or generally, to the direction of flight or motion.

Aircraft cargo management systems as disclosed herein allow cargo to be loaded into an aircraft and positioned within the aircraft in a simple, elegant manner. In that regard, aircraft cargo management systems as disclosed herein may reduce part count and associated replacement/wear costs over time.

Figure 1:
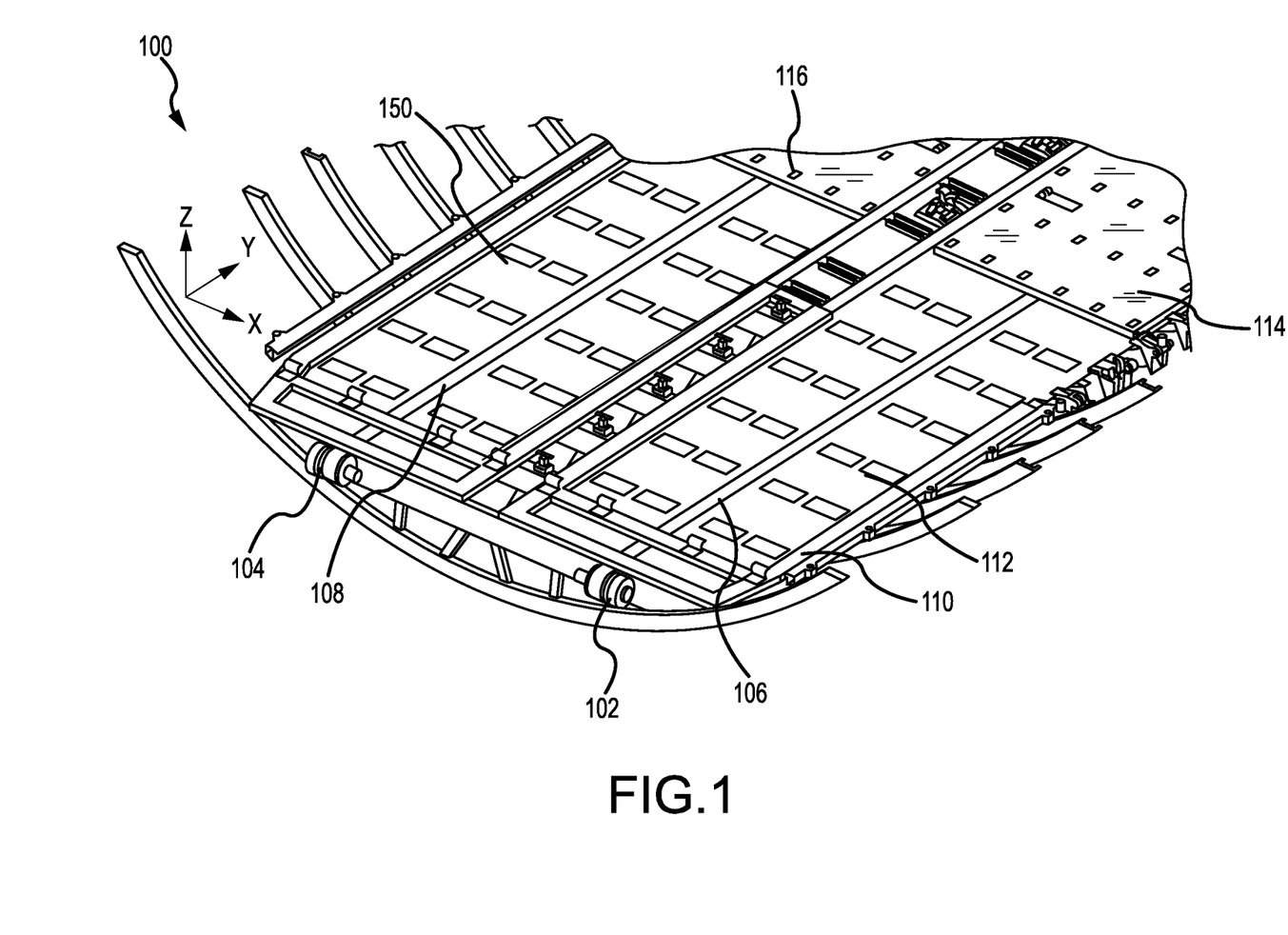
FIG. 1 illustrates a portion of a cargo management system, in accordance with various embodiments.
Figure 2:
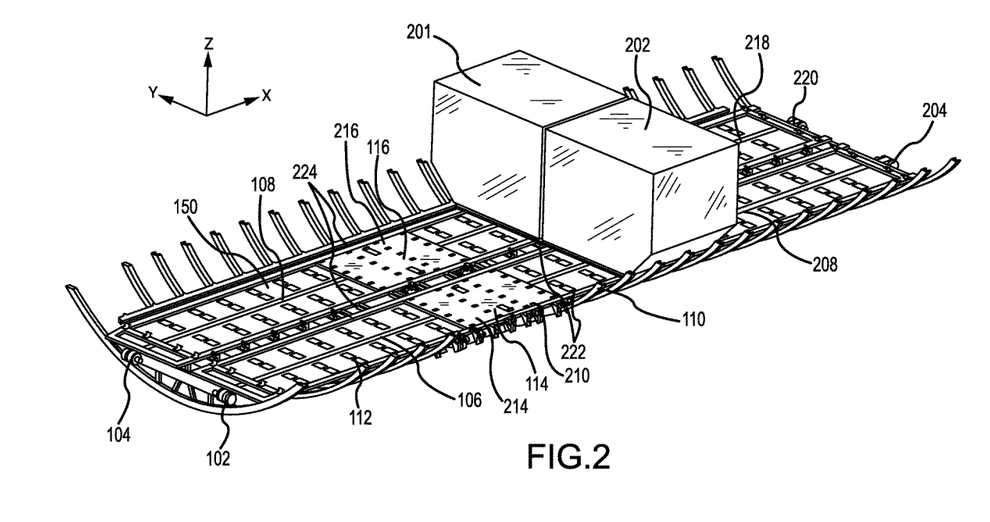
FIG. 2 illustrates a portion of a cargo management system, in accordance with various embodiments.

With reference to FIGS. 1 and 2 aircraft cargo management system 100 is illustrated using an x, y, and z axes for ease of illustration. Cargo shuttle 114 and 116 are shown forward of an aft portion of an aircraft. Cargo shuttle 114 and 116 may be a slide bushing supported cargo shuttle. Cargo shuttle 114 is coupled to aft drive shuttle belt 106 and cargo shuttle 116 is coupled to aft drive shuttle belt 108. Aft drive shuttle belt 106 is coupled to aft shuttle drive unit 102. Aft drive shuttle belt 108 is coupled to aft shuttle drive unit 104. Floor panel 112 is shown beneath cargo shuttle 114. Floor panel 150 is shown beneath cargo shuttle 116. As used with respect to cargo shuttle 114 and 116, the term "beneath" may refer to the negative z direction. Support rails 222 and 224 are shown laterally adjacent to floor panels 112 and 150. Support rails 222 and 224 may be mounted to another aircraft component, such as an airframe, and may be capable of supporting the weight of cargo 201. Cargo shuttle may comprise a housing 210. Cargo shuttle 114 and 116 may comprise a top surface 214 and 216 respectively.

Figure 3:
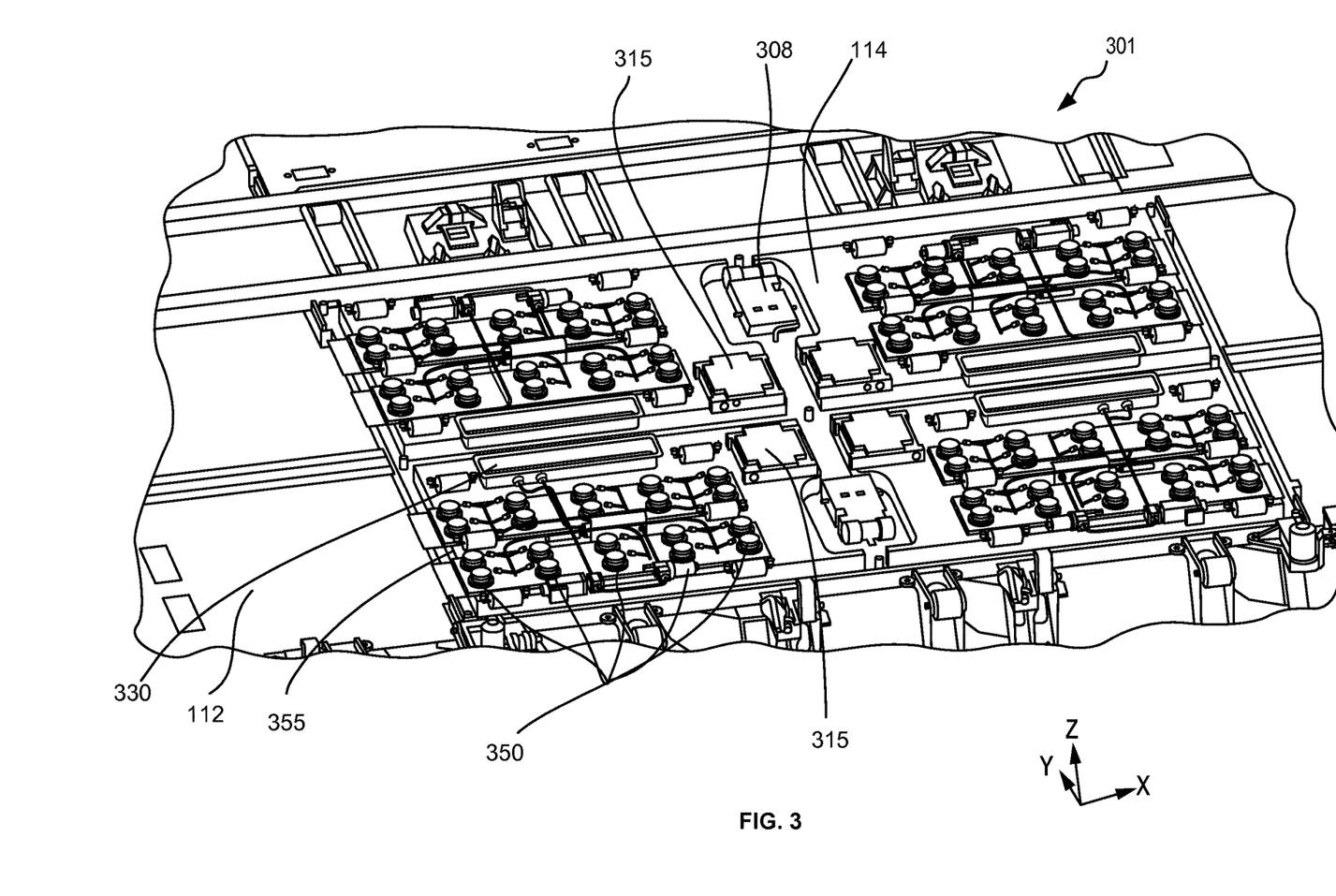
FIG. 3 illustrates a portion of a cargo management system, in accordance with various embodiments.

According various embodiments, top surface 214 and 216 may comprise conveyance rollers such as a power drive unit 308 and roller 306 mounted to it to allow cargo to be pulled onto and off of the cargo shuttle. Top surface 214 and 216 may be friction resistant, such as via surface features and/or applied coating. Floor panel 112 may comprise at least one of a composite material or a metallic material.

Cargo shuttle 114 is coupled to forward drive shuttle belt 208 and cargo shuttle 116 is coupled to forward drive shuttle belt 218. Forward drive shuttle belt 208 is coupled to forward shuttle drive unit 204. Forward drive shuttle belt 218 is coupled to forward shuttle drive unit 220. Cargo 202 is shown as resting on support rails 222 and cargo 201 is shown as resting on support rails 224. Cargo shuttle 116 may be used to lift cargo 201 off support rails 224 and move cargo 201 forward or aft.

Forward drive shuttle belt 208, forward drive shuttle belt 218, aft drive shuttle belt 106, and aft drive shuttle belt 108 (collectively, a "shuttle belt") may comprise any suitable belt capable of pulling a cargo shuttle. For example, a shuttle belt may comprise a flat belt. In that regard, a flat shuttle belt may not occupy excess space along the z direction. For example, a shuttle belt may comprise a polyurethane coated belt that includes a communications and power bus. In that regard, the structural support and power/data functions are provided by a single shuttle belt structure. For example, in various embodiments, a shuttle belt may comprise steel wires oriented in parallel and coated with polyurethane to hold the steel wires together, provide anti-friction properties, and noise dampening properties. Among the steel wires may be copper wires or other wires that are capable of carrying an electrical current at any suitable voltage. In that regard, the shuttle belt may comprise one or more copper wires to carry high voltage power and/or low voltage electrical signals that may convey data.

The shuttle belts may be wound around a portion of forward shuttle drive unit 204, forward shuttle drive unit 220, aft shuttle drive unit 102 and aft shuttle drive unit 104 (collectively, "shuttle drive unit"). In that regard, a shuttle drive unit may comprise a cylindrical structure (e.g., a bobbin) to which a shuttle belt is affixed. The shuttle drive unit comprises a motive device, such as an electric motor, to rotate the bobbin in a desired direction. The shuttle drive unit may be geared in such a manner so that free rotation of the bobbin is allowed and/or such that low resistance to free motion is produced. This resistive force may be supplied by a brake and/or be supplied by the motor providing a negative torque to the gear system, thereby regenerating power, which may be added back to the aircraft power bus. Thus, as forward shuttle drive unit 204 may be rotating its bobbin to pull forward drive shuttle belt 208 forward, aft shuttle drive unit 102 may allow its bobbin to freely rotate in response to the force exerted by forward drive shuttle belt 208 through cargo shuttle 114. In like manner, as aft shuttle drive unit 102 may be rotating its bobbin to pull aft drive shuttle belt 106 aft, forward shuttle drive unit 204 may allow its bobbin to freely rotate in response to the force exerted by aft drive shuttle belt 106 through cargo shuttle 114.

Accordingly, as forward shuttle drive unit 220 may be rotating its bobbin to pull forward drive shuttle belt 218 forward, aft shuttle drive unit 10 may allow its bobbin to freely rotate in response to the force exerted by forward drive shuttle belt 108 through cargo shuttle 116. In like manner, as aft shuttle drive unit 104 may be rotating its bobbin to pull aft drive shuttle belt 108 aft, forward shuttle drive unit 220 may allow its bobbin to freely rotate in response to the force exerted by aft drive shuttle belt 108 through cargo shuttle 116.

Figure 4:
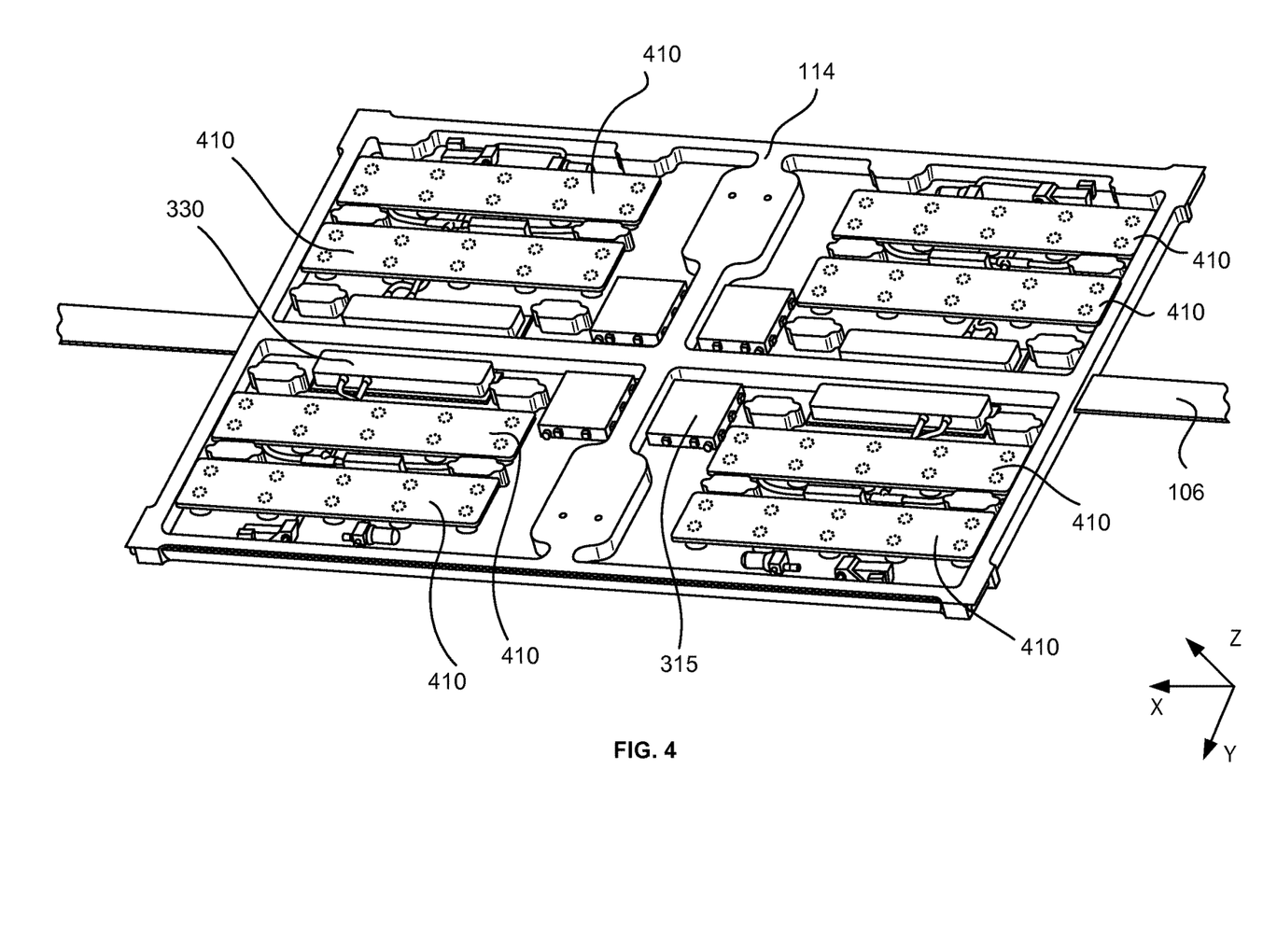
FIG. 4 illustrates the underside of a shuttle guide assembly, in accordance with various embodiments.

With reference to FIGS. 3 and 4, cargo shuttle 114 is shown. It should be understood that cargo shuttle 116 is similarly structured and thus the features discussed herein relative to cargo shuttle 114 are also applicable to cargo shuttle 116. Power drive unit 308 and roller 306 are shown in cargo shuttle 114. The top surface 214 (as shown in FIG. 2) of cargo shuttle 114 is not depicted in FIG. 3, to better illustrate certain aspects of the design. For instance, cargo shuttle 114 may comprise a controller 315 for directing operation of one or more hydraulic lift systems 301. It should be appreciated that though a hydraulic lift system 301 is disclosed herein for moving bushing slide plate 410, any mechanism for moving bushing slide plate 410 may be used, such as pneumatic, and/or electronic actuator may be utilized. The hydraulic lift system 301 may comprise a hydraulic lift actuator 350. The hydraulic lift system 301 may comprise a hydraulic pipe 355 configured to supply a fluid, such as oil, to the hydraulic lift actuator 350. The hydraulic lift system 301 may comprise a fluid reserve 330, such as an oil reserve, for storing fluid to be delivered via the hydraulic pipe 355. The hydraulic lift system 301 may comprise a fluid pump for moving fluid within the hydraulic pipe 355. The hydraulic lift actuator 350 may be coupled to a bushing slide plate 410 (with reference to FIG. 4). According to various embodiments, hydraulic lift actuator 350 may comprise a hydraulic piston that extends in response to hydraulic fluid pumping through the hydraulic pipe 355. The hydraulic fluid pushes the hydraulic piston down (i.e., in the negative Z direction). Stated another way, the hydraulic actuator 350 may be configured to extend the bushing slide plate 410 from the cargo shuttle 114 in a first direction normal to a face of a top surface 214 of the cargo shuttle 114. Power drive unit 308 may drive cargo such as cargo 202, onto and off cargo shuttle 114. Roller 306 may facilitate movement of cargo 202 with respect to cargo shuttle 114.

Figure 5:
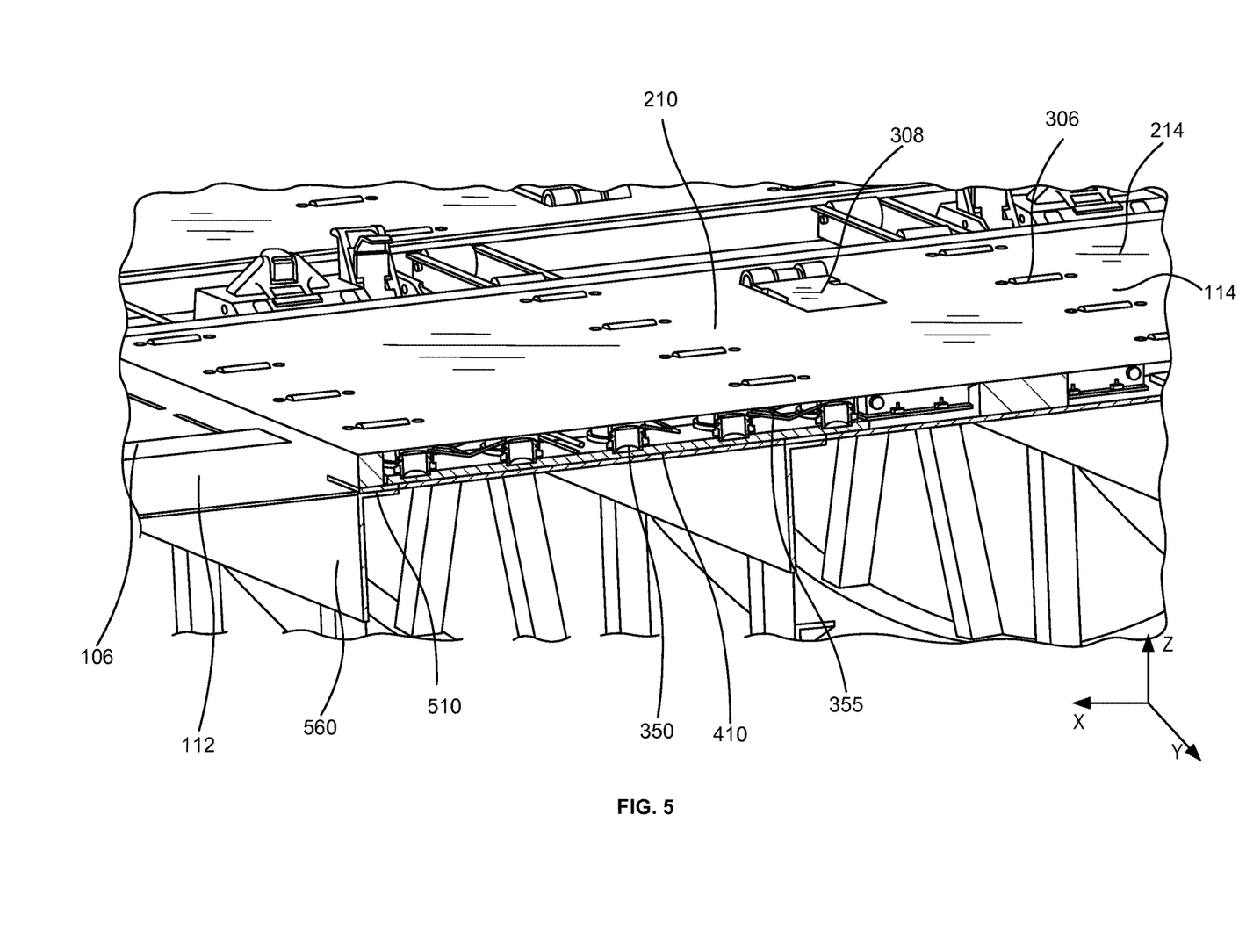
FIG. 5 illustrates a partial side cut-away view of shuttle guide assembly, in accordance with various embodiments.
Figure 6:
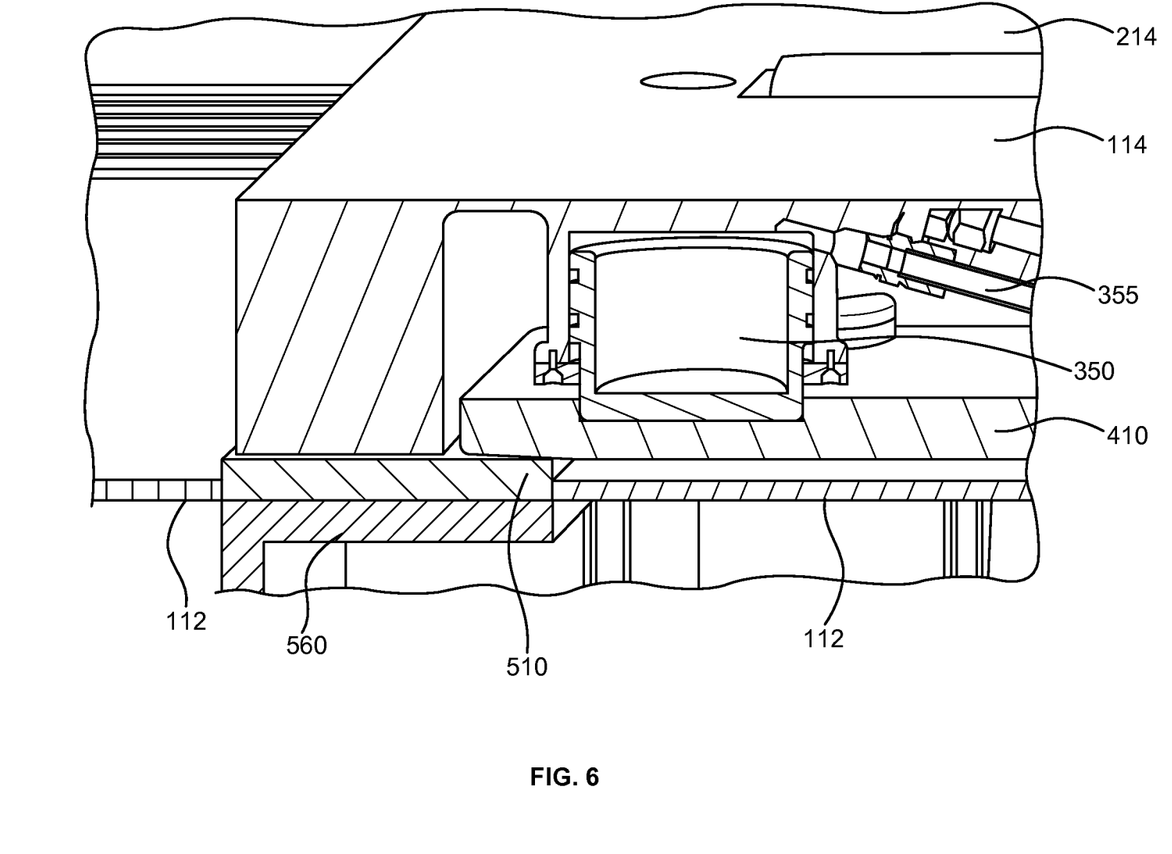
FIG. 6 illustrates a portion of a partial side cut-away view of shuttle guide assembly, in accordance with various embodiments.

According to various embodiments, FIG. 4 depicts the underside of cargo shuttle 114. The bushing slide plate 410 are configured to move in the (negative Z) direction with respect to the cargo shuttle 114. Bushing slide plate 410 may be made from any desired material, for instance, a steel or a hard anodized aluminum material. As depicted, one or more hydraulic lift actuators 350 may be coupled to a bushing slide plate 410. Each hydraulic lift actuator 350 may be configured for independent operation. According to various embodiments and with brief reference to FIGS. 5 and 6, a bushing 510, such as a fiber reinforced, self-lubricating polymer bushing, may be used to support the cargo shuttle 114 which supports cargo 202 (e.g., cargo containers) during transport within the aircraft. FIG. 5 depicts a cut-away view of a portion of cargo shuttle 114. Bushings 510 may be plastic-based bushings. For example, bushings 510 may be fiber reinforced polymer self-lubricating bushings, such as an internally lubricated, acetal-based material such as that sold under the trademark Turcite® T47 which is available from Trellebord Sealing Solutions, Fort Wayne, Ind. When cargo shuttle 114 is providing lift to cargo 202 such that cargo 202 is lifted from support rails 222, or when no cargo 202 is positioned on cargo shuttle 114, cargo shuttle 114 may move forward or aft, based on tension applied to forward drive shuttle belt 208. When moving forward or aft in a lifted or cargo-less state, cargo shuttle 114 may glide over bushings 510 without or with few other friction contact points counteracting the movement of cargo shuttle 114. Specifically, the bushing slide plates 410 of cargo shuttle 114 may glide over bushings 510 without or with few other friction contact points counteracting the movement of cargo shuttle 114. In this way, bushing slide plates 410 may be compared to a sled runner that slides across the top of bushings 510. Bushings 510 may be coupled to the aircraft floor beam and/or the composite floor panel 112. Cargo 202 may be pulled across door conveyance rollers 306 and onto cargo shuttle 114 by the two shuttle power drive units 308 (PDU) on coupled to each cargo shuttle 114. According to various embodiments, the aircraft may not comprise a floor (i.e. composite floor panel 112) in its cargo hold. Thus, the bushings 510 may be mounted to the aircraft structure and the cargo shuttle 114 may glide across the top of the floor beams such as on the bushings 510.

The aircraft floor beams 560 are covered by a thin composite sheet, such as floor panel 112, giving the cargo shuttle 114 operators a lightweight, easily maintained surface that is also capable of supporting the weight of one or more humans. This closed floor construction also facilitates quick assembly times in the factory, and easy aircraft cleaning.

Bushings 510 may be made from various materials. For instance, bushings 510 may be made such as an internally lubricated, acetal-based material such as that sold under the trademark Turcite, and/or a thermoplastic, coated metals such as polytetrafluoroethylene (PTFE) coated aluminum, etc. In response to hydraulic oil being forced through the hydraulic piping 355 into the hydraulic lift actuator 350, the bushing slide plate 410 is forced downward (i.e., in the negative Z direction) against the bushings 510. This force causes the top surface 214 of cargo shuttle 114 to lift upward (i.e., in the positive Z direction), causing a cargo pallet (e.g., cargo 202) to be lifted off the composite container support rails 222 and 224. Stated another way, in response to hydraulic oil being delivered by a hydraulic pump via the hydraulic piping 355, the volume of oil within the hydraulic lift actuator 350 is increased, forcing a portion of the lift actuator coupled to the bushing slide plate 410 to move down relative to the top surface 214 of cargo shuttle 114 (See FIG. 6). In this way, the bushing slide plate 410 is extended and the top surface 214 of cargo shuttle 114 moves in the positive Z direction based on contact with at least one of bushing 510 or floor panel 112. The cargo belt, such as the aft drive shuttle belt 106, pulls that assembly across the floor. Location sensors (not shown) such as proximity sensors housed on cargo shuttle 114 may indicate that a desired proximity of cargo shuttle 114 to cargo 202 is reached and/or determined.

Moreover, data from proximity sensors may be used to detect and compensate for uneven cargo loads. For example, in the event cargo 202 shifts to one portion of cargo shuttle 114 or otherwise exerts more force on a portion of cargo shuttle 114 relative to another, data from proximity sensors may detect that one portion of cargo shuttle 114 is not as far from floor panel 112 as one or more other portions of cargo shuttle 114. In that regard, where insufficient distance from floor panel 112 is achieved, a controller 302 may command its associated hydraulics to increase output to compensate for the uneven load. According to various embodiments, the actuators 350 may be commanded to be fully deployed, fully retracted or positions in between. Actuators 350 may not be sensitive to uneven loading as the hydraulics are significantly more rigid than other systems.

In that regard, in operation, cargo such as cargo 202 may be loaded onto cargo shuttle 114 at an aft position, such as a position proximate aft shuttle drive unit 102. Cargo 202 may be positioned onto cargo shuttle 114 using power drive unit 308 and roller 306. During loading of cargo 202, cargo shuttle 114 may be in contact with floor panel 112. Once cargo 202 is suitably positioned on top of cargo shuttle 114 (where the phrase "on top" in this context may refer to distance across the positive z direction), a control system (e.g., controller 302) may instruct hydraulic actuator 304 to begin operation. After the power drive unit 308 brakes are set, the cargo shuttle 114 raises the cargo 202 off of the support rails 224. In the present embodiment, hydraulic actuators are utilized to lift cargo shuttle 114. In various embodiments, linear, electro-mechanical, or pneumatic actuators could also be utilized. In response to the top surface 214 of cargo shuttle 114 being lifted, the cargo shuttle 114 may be moved laterally to a desired location, generally either forward or rearward, moving cargo 202 to the desired location. Once the cargo 202 is at the desired location, the hydraulic pressure within the cargo shuttle 114 actuators will be reduced, causing the top surface 214 of cargo shuttle 114 to sink toward floor panel 112, lowering cargo 202 onto support rails 224. In this way, the cargo 202 may lift apart from the top surface 214. Once cargo 202 has been set onto the support rails 222, cargo shuttle 114 may be moved from under the cargo 202 back to the home position at the aircraft door to pick up its next load. Cargo shuttle 114 may move as force is applied to aft shuttle drive belt 106. In general, in this context the force applied by forward shuttle drive unit 204 is greater than aft shuttle drive unit 102. To move cargo shuttle 114 aft, more force may be applied via aft shuttle drive unit 102 may be greater than the force that is supplied by forward shuttle drive unit 204. Cargo shuttle 116 may move forward and aft in the same manner. Cargo shuttle 114, specifically, bushing slide plate 410 of cargo shuttle 114, may glide over on or more substantially stationary bushings 510 when cargo shuttle 114 moving forward or aft. In this context, the phrase "lift apart" may refer to movement of cargo shuttle 114 in the positive z direction.

A control system comprising, for example, a processor and a tangible, non-transitory memory may be configured to be in electrical and/or logical communication with controller 315. For example, the control system may communicate with hydraulic lift actuator 350 via one or more shuttle belts. The control system and/or controller 315 may instruct the hydraulic lift actuator 350 to retract, extend and to modulate the output hydraulic pressure within the hydraulic lift system 301.

During operation of hydraulic lift actuator 350, cargo 202 may lift apart from support rails 222. While cargo 202 is lifted apart from floor panel 112, the forward shuttle drive unit 204 may rotate its bobbin, causing forward drive shuttle belt 208 to pull cargo shuttle 114 and cargo 202 forward. Aft shuttle drive unit 102 may be allowed to exert a low level drag force on aft drive shuttle belt 106, thus allowing aft drive shuttle belt 106 to extend in a forward direction. A low level drag force exerted by aft drive shuttle belt 106 may prevent excessive cargo 201 velocity and may maintain stability in the event an aircraft is not precisely level. Once cargo 202 is positioned in the aircraft at a desired position, the control system may instruct the hydraulic actuator 304 to turn off or lower the top surface 214 of cargo shuttle 114. In that regard, due to loss of hydraulic pressure, the top surface 214 of cargo shuttle 114 may move in a negative z direction such that the cargo 202 contacts and comes to rest on support rails 222. Thus, the cargo shuttle 114 e.g., the top surface 214 of cargo shuttle 114, may separate from the cargo 202 as the cargo 202 is restrained from motion in the negative z direction by support rails 222. In this manner, cargo shuttle 114 may be brought aft to load additional cargo 202. The aft shuttle drive unit 102 may rotate its bobbin, causing aft drive shuttle belt 106 to pull cargo shuttle 114 aft. Additional cargo 202 may now be loaded and the process may proceed again.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A cargo management system comprising:
   a cargo shuttle having a top surface and a bushing slide plate, wherein the top surface is parallel to the bushing slide plate and is configured to support cargo;
   an actuator coupled to the bushing slide plate configured to move the bushing slide plate upward and downward relative to the top surface of the cargo shuttle, wherein the bushing slide plate remains parallel with the top surface of the cargo shuttle;
   an aft shuttle drive belt coupled to the cargo shuttle;
   a forward shuttle drive belt coupled to the cargo shuttle; and
   a floor panel having a plurality of bushings disposed beneath the cargo shuttle, wherein the plurality of bushings are parallel with the bushing slide plate and the cargo shuttle is configured to slide across the plurality of bushings.

2. The cargo management system of claim 1, wherein the actuator is a hydraulic actuator.

3. The cargo management system of claim 2, wherein a hydraulic pressure of the hydraulic actuator is controlled by a controller.

4. The cargo management system of claim 1, wherein the actuator is configured to extend the bushing slide plate from the cargo shuttle in a first direction normal to a face of a top surface of the cargo shuttle.

5. The cargo management system of claim 1, further comprising:
   an aft shuttle drive unit coupled to the aft shuttle drive belt and configured to apply aft-ward force to the aft shuttle drive belt; and
   a forward shuttle drive unit coupled to the forward shuttle drive belt and configured to apply forward force to the forward shuttle drive belt.

6. The cargo management system of claim 1, wherein the bushing slide plate comprises a first planar surface that engages and slides across a second planar surface of the plurality of bushings.

7. The cargo management system of claim 6, wherein the plurality of bushings are self-lubricating polymer bushings.

8. The cargo management system of claim 7, wherein the floor panel comprises at least one of a composite material or a metallic material.

9. The cargo management system of claim 6, wherein the cargo shuttle is adapted to move forward or aft-ward over the plurality of bushings.

10. The cargo management system of claim 1, further comprising support beams configured to receive cargo, wherein, in response to the cargo shuttle being positioned beneath the cargo and the top surface of the cargo shuttle being moved upward, the top surface of the slide bushing lifts the cargo from the support beams.

11. A slide bushing supported cargo shuttle comprising:
    a housing;
    a bushing slide plate, wherein the bushing slide plate is extendable from the housing via an actuator;
    a top surface configured to move upward and downward relative to the bushing slide plate, wherein the top surface remains parallel with the bushing slide plate and is configured to support cargo; and
    a power drive unit coupled to the top surface;
    wherein the bushing slide plate has a first planar surface that is configured to interact with and slide across a second planar surface of a plurality of bushings disposed in a floor panel beneath the slide bushing supported cargo shuttle.

12. The slide bushing supported cargo shuttle of claim 11, wherein the top surface is adapted to contact a cargo bottom surface.

13. The slide bushing supported cargo shuttle of claim 11, wherein the actuator is a hydraulic actuator.

14. The slide bushing supported cargo shuttle of claim 11, wherein the plurality of bushings are self-lubricating polymer bushings.

* * * * *